(No Model.)

H. C. McCLEAVE.
HOOF TRIMMER.

No. 494,013.  Patented Mar. 21, 1893.

WITNESSES:
J. A. Bergstrom
C. Sedgwick

INVENTOR
H. C. McCleave
BY Munn & Co.
ATTORNEYS.

UNITED STATES PATENT OFFICE.

HENRY C. McCLEAVE, OF TRIMBLE, ILLINOIS.

HOOF-TRIMMER.

SPECIFICATION forming part of Letters Patent No. 494,013, dated March 21, 1893.

Application filed August 2, 1892. Serial No. 441,921. (No model.)

*To all whom it may concern:*

Be it known that I, HENRY C. MCCLEAVE, of Trimble, in the county of Crawford and State of Illinois, have invented a new and useful Improvement in Hoof-Trimmers, of which the following is a full, clear, and exact description.

This invention relates to devices for trimming the hoofs of horses or other animals preparatory to shoeing them, and it consists in a tool of novel construction for this purpose, substantially as hereinafter described and more particularly pointed out in the claim, and whereby the trimming may be done in much less time and with greater ease or less muscular exertion than is usually required for such work.

Reference is to be had to the accompanying drawings forming a part of this specification, in which similar letters of reference indicate corresponding parts in all the figures.

Figure 1:
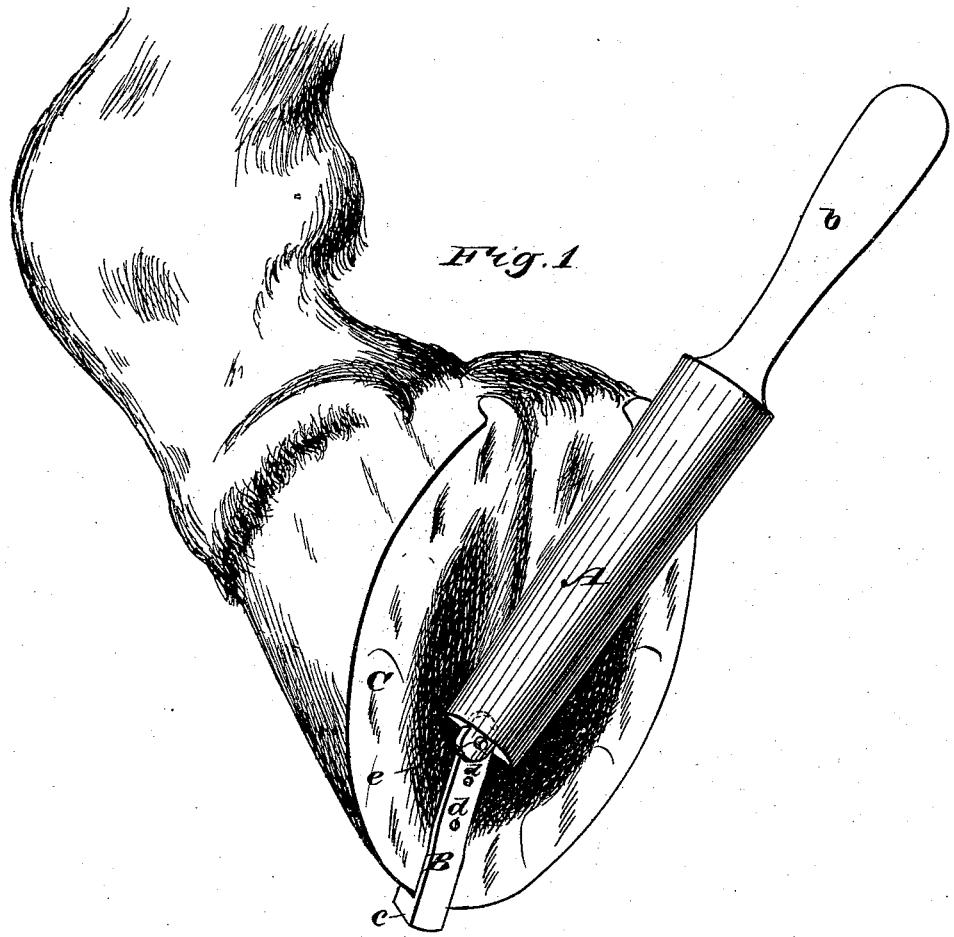
Figure 2:
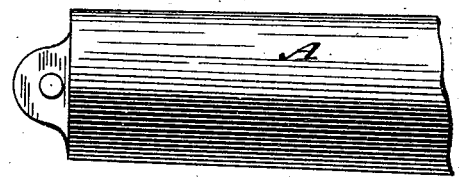
Figure 3:
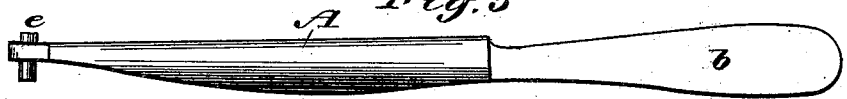
Figure 4:

Figure 1 represents a view in perspective of a horse's leg in part, with my improved trimming device applied to trimming the hoof thereof. Fig. 2 is a longitudinal back or outside face view of the knife portion of the tool, in part. Fig. 3 is a side or edge view of said knife portion of the tool; and Fig. 4 is a transverse section thereof through the blade portion of the knife.

The implement consists of two leading parts or elements, namely, a knife part A having an attached handle $b$, and an adjustable fulcrum part or bar B having an upturned hook or lip $c$ at its outer end and any number of holes $d$ in and along it for attachment of the inner end of the knife by a pivot $e$ to it. The fulcrum part or bar B is engaged by the hook or lip $c$ with the underside of the hoof C of the animal, at the toe thereof or any other part of the bottom of the hoof, to set the knife in position to cut any required part of the hoof. The thumb of the hand which holds the foot of the animal is placed on the outside of the fulcrum piece or bar B to hold it in position, while the handle $b$ of the knife A pivoted to said fulcrum bar is held by the other hand to vibrate the knife A to cut the hoof as required, the knife working on the underside of the fulcrum bar or piece B. The knife A is of reversely beveled or arched form transversely on its back as shown in Fig. 4, to give it two or double cutting edges so that it will cut in both strokes of its vibration and may be worked to the right or left, thus saving time, and it is curved or arched longitudinally on its face $f$ as shown in Fig. 3 to facilitate shaping the hoof for the fit of the shoe.

The fulcrum piece B by means of its series of holes $d$ is made adjustable by transposing the pivot $e$ of the knife to any one of said holes to adapt the tool to different sized hoofs.

It is not necessary that the pivot $e$ should be a separate piece as it might be an integral part of the knife by turning the end of the latter down and fashioning it to form a pivot.

Having thus fully described my invention, I claim as new and desire to secure by Letters Patent—

In a tool for trimming the hoofs of horses and other animals, the combination of a vibrating double edged knife, with an adjustable fulcrum piece or bar provided with an upturned hook or lip at its outer end and having a series of holes in and along it, and a pivot uniting the one end of said knife with said fulcrum piece through any one of said holes as required, essentially as set forth.

HENRY C. McCLEAVE.

Witnesses:
JAMES GOOD,
THOMAS HARBISON.